United States Patent Office 3,679,397
Patented July 25, 1972

3,679,397
BACTERIAL LEACHING PROCESS
Lawrence T. O'Connor, Tucson, Ariz., and James A. Brierley and Roshan B. Bhappu, Socorro, N. Mex., assignors to The Regents, New Mexico Institute of Mining and Technology, Socorro, N. Mex.
No Drawing. Filed Dec. 29, 1969, Ser. No. 888,815
Int. Cl. B22b 3/00
U.S. Cl. 75—101                      12 Claims

ABSTRACT OF THE DISCLOSURE

A process for leaching metallic constituents from metallurgical materials and lixiviant composition therefor wherein the lixiviant solution contains ferrous sulfate, bacteria and carbamide phosphoric acid (urea phosphoric acid).

---

This invention relates to a process for leaching metals and a leaching composition therefor, and more particularly to a method and composition for leaching metals utilizing oxidizing bacteria.

The development of metallurgical methods for refining low-grade ores is becoming increasingly important as the supplies of high-grade ore are being continuously depleted. It has been a long-standing practice, for example, to leach waste rock from copper mines with water with the result that the leach solution slowly acquires a low concentration of copper ions as well as soluble iron and sulfuric acid. It was originally thought that sulfuric acid was formed by atmospheric oxidation of the sulfide and other sulfur-containing materials in the ore and that the copper present in the leach solution was a result of the action of sulfuric acid on the waste rock.

Research to investigate this effect was undertaken, and it was discovered that the presence of soluble iron, copper and sulfuric acid was not due to the simple chemical process as originally postulated, but was due instead to a microbiological process. The results of this research was corroborated by analysis of acidic waste water from various mines which confirmed the presence of autotrophic bacteria capable of oxidizing iron, referred to as *Thiobacillus ferrooxidans*, and bacteria capable of oxidizing sulfur, referred to as *Thiobacillus thiooxidans*. Such bacteria and their use in leaching various minerals is now well documented in the literature (see, for example, Bryner et al., Ind. and Eng. Chem., 46, pp. 2587–2592, 1952; and Duncan et al., Applied Microbiology, 12, pp. 122–126, 1964).

It has been proposed in U.S. Pat. No. 2,829,964 to utilize such bacteria in a cyclic leaching process wherein a lixiviant solution containing ferrous sulfate and sulfuric acid is inoculated with iron-oxidizing bacteria, *Thiobacillus ferrooxidans*, and the resulting solution is contacted with a low-grade ore. After the lixiviant solution, pregnant with the metal to be recovered, such as copper, is separated from the solids, the copper is removed by precipitation on scrap iron, and the spent lixiviant solution is regenerated by aeration prior to reuse.

However, the process of the aforementioned patent has the disadvantage that the action of the bacteria on the low-grade ore in producing soluble copper is so slow that the process is not commercially attractive. Attempts have been made to enhance the bacterial activity in the leach solution by adding nutrients, such as nitrogen in the form of a nitrate or an ammonium ion, but have been met with little or no success.

It is accordingly an object of the present invention to provide a bacterial leaching process and composition therefore which overcomes the aforementioned disadvantages of prior art processes.

It is a further object of the present invention to provide a bacterial leaching process and composition therefor in which the leaching solution has increased activity.

It is yet another object of the present invention to provide a bacterial leaching composition which is effective at a commercially acceptable rate.

These and other objects and advantages of the present invention will appear hereinafter and it will be understood that the following specific examples are provided by way of illustration and not by way of limitation.

The concept of the present invention resides in the formulation of a lixiviant solution containing iron-oxidizing bacteria with a small amount of carbamide phosphoric acid, either alone or in combination with other materials, whereby the activity is greatly increased. The function of the carbamide phosphoric acid is not clearly understood although, without limiting the invention to any particular theory, it is believed that its function is uniquely metabolic in that it makes nitrogen and phosphorus available in vivo. In any event, the rate at which the metal to be extracted accumulates in the lixiviant solution is sufficiently increased when phosphorous carbamide is present in the lixiviant solution to render the process commercially acceptable.

As the basic lixiviant solution to which the carbamide phosphoric acid is added, use can be made of mine water, such as from a copper mine, in which the bacteria are naturally occurring, or a synthetic lixiviant solution which has been inoculated with the bacteria. Such synthetic lixiviant solutions are preferably formulated to contain ferrous sulfate in a concentration of 1–100 g. per liter of solution. Depending somewhat on the nature of the metal to be leached, the lixiviant solution may also contain an alkali or alkaline earth metal halide or nitrate or a mixture thereof, and various sulfates, such as magnesium sulfate, aluminum sulfate, ammonium sulfate or mixtures thereof, as well as sulfuric acid. When present, it is generally preferred that the lixiviant solution contain .001 to 10 g. per liter of the halide and from 1–500 g. per liter of the sulfate or sulfuric acid.

To a lixiviant solution containing the foregoing components is added carbamide phosphoric acid, and the resulting solution is inoculated with iron-oxidized bacteria. The solution can then be brought into contact with a metallurgical ore whereby the bacteria present in the lixiviant solution cause the metallic constituents in the metallurgical material to be oxidized to a water-soluble state. The metal ions taken into the solution can be removed by conventional methods, as by precipitation of scrap iron or similar metals, and the lixiviant can be reused if desired. The process of the present invention may be used in the leaching for recovery of a wide variety of metals, including copper, zinc, nickel, cobalt, uranium, vanadium, molybdenum as well as a wide variety of other metals.

The bacteria for use as the inoculum can most conveniently be derived from a sample of mine water. Use can be made of the species known as *Thiobacillus ferrooxidans* or its mixture with *Thiobacillus thiooxidans*.

The bacteria are non-spore forming, and are autotrophic in nature, deriving their energy from the oxidation of ferrous iron or sulfur and using carbon dioxide as a source of carbon.

The following examples will illustrate the principal concepts of the invention:

EXAMPLES I THROUGH V

A lixiviant solution is formulated to have the following composition:

| | |
|---|---|
| NaCl | g__ 0.015 |
| $MgSO_4 \cdot 7H_2O$ | g__ 8.5 |
| $CaCl_2$ | g__ 0.04 |
| $Al_2(SO_4)_3 \cdot 18H_2O$ | g__ 100.00 |
| $FeSO_4 \cdot 7H_2O$ | g__ 21.5 |
| Water | ml__ 1000.0 |

Fifty milliliters of the lixiviant solution are added to each of five air-lift percolators, each of which contained 100 grams of 14 mesh low-grade copper ore, and are allowed to percolate for one hour to allow each of the columns to reach equilibrium. Then, a sample of the leach solution is removed from each column to determine the copper concentration, and the solution level was adjusted to return it to 50 ml.

Each column, except column 1, is inoculated prior to percolation with a mixture culture of *Thiobacillus ferrooxidans* and *Thiobacillus thiooxidans*.

To supply nitrogen or phosphorus ions, ammonium sulfate and potassium dihydrogen phosphate are added to columns 1 to 3. Phosphoric acid carbamide is formulated only in the solutions in columns 3 and 4. The results are set forth in the following Table I.

TABLE I

| Column | Leach solution | Copper in leach solution (p.p.m.) | | | |
|---|---|---|---|---|---|
| | | Initial | After 96 hrs. | After 142 hrs. | After 168 hrs. |
| 1 | Lixiviant solution: 0.08 g. $NH_4^+$ per 100 ml., 0.001 g. $PO_4^{-3}$ per 100 ml. (no microbial activity). | 690 | 786 | 900 | 1,118 |
| 2 | Lixiviant solution (microbial activity): 0.08 g. $NH_4^+$ per 100 ml., 0.001 g. $PO_4^{-3}$ per 100 ml. | 760 | 954 | 1,324 | 2,018 |
| 3 | Lixiviant solution (microbial activity): 0.2 g. carbamide phosphoric acid per 100 ml., 0.08 g. $NH_4^+$ per 100 ml., 0.007 g. $PO_4^{-3}$ per 100 ml. | 615 | 1,028 | 1,360 | 1,870 |
| 4 | Lixiviant solution (microbial activity): 0.2 g. carbamide phosphoric acid per 100 ml. | 760 | 1,214 | 1,798 | 2,671 |
| 5 | Lixiviant solution (microbial activity). | 680 | 932 | 1,446 | 2,378 |

As can be seen from the foregoing table, the presence of carbamide phosphoric acid in the lixiviant solution increases the amount of copper leached during the first 96 hours of leaching by over 30%.

It will be appreciated that the copper in the lixiviant solution may be separated therefrom by any of a wide variety of conventional techniques, such as by adding scrap iron to the solution whereby copper is precipitated as sponge copper.

The amount of carbamide phosphoric acid added to the lixiviant varies somewhat, depending upon the metal to be extracted, but is generally within the range of 0.01 to 25.0 parts per thousand, and preferably within the range of 0.5 to 5 parts per thousand.

In accordance with another concept of the present invention, the lixiviant may contain, in addition to carbamide phosphoric acid, a source of phosphorus, such as the water-soluble polyphosphates of the alkali metals, such as sodium, potassium and the like, the alkaline earth metals such as calcium, magnesium, etc., and ammonium. Particularly preferred are the hexametaphosphates and tripolyphosphates, although a variety of phosphatic materials may be employed so long as they are not precipitated by ions of the alkaline earth metals which may be present in the lixiviant solution.

The following examples will serve to illustrate this concept of the invention.

EXAMPLE VI

A lixiviant solution is formulated to have the following compositions.

| | |
|---|---|
| NaCl | g__ 0.010 |
| $MgSO_4 \cdot 7H_2O$ | g__ 10.0 |
| $CaCl_2$ | g__ 0.05 |
| $Al_2(SO_4)_3 \cdot 18H_2O$ | g__ 0.05 |
| $FeSO_4 \cdot 7H_2O$ | g__ 20.0 |
| Carbamide phosphoric acid | g__ 1.85 |
| $Na_6P_6O_8$ | g__ 1.0 |
| Water | ml__ 1000.0 |

Fifty milliliters of the solution inoculated with a culture of *T. ferrooxidans* are placed in an air-lift percolator containing 100 g. of a low-grade copper ore. After 100 hours of operation, a higher yield of copper is obtained as compared to a control test under identical conditions but without the addition of carbamide phosphoric acid and phosphatic compound.

EXAMPLE VII

A lixiviant solution is formulated to include sodium tripolyphosphate as follows:

| | |
|---|---|
| $MgSO_4 \cdot 7H_2O$ | g__ 10.0 |
| $Al_2(SO_4)_3 \cdot 18H_2O$ | g__ 100.0 |
| $FeSO_4 \cdot 7H_2O$ | g__ 25.0 |
| Carbamide phosphoric acid | g__ 2.0 |
| $Na_5P_3O_{10}$ | g__ 1.5 |
| Water | ml__ 1000.0 |

The foregoing solution is contacted with a copper ore in the same manner shown in Example VI, and comparable results are obtained.

It will be understood that, if desired, mixtures of phosphatic materials, such as the hexametaphosphates and tripolyphosphates illustrated above, may be used. The amount of the phosphatic component can generally be varied in the range of .001 to 10 grams per liter of lixiviant solution.

In accordance with a further concept of the invention, thiourea may be used in combination with carbamide phosphoric acid in the lixiviant solution, as illustrated by the following example.

EXAMPLE VIII

| | |
|---|---|
| NaCl | g__ 0.015 |
| $MgSO_4 \cdot 7H_2O$ | g__ 9.0 |
| $Al_2(SO_4)_3 \cdot 18HO$ | g__ 100.0 |
| $FeSO_4 \cdot 7H_2O$ | g__ 25.0 |
| Carbamide phosphoric acid | g__ 2.0 |
| Thiourea | g__ 0.5 |
| Water | ml__ 1000.0 |

Comparable results are obtained when the lixiviant solution is employed in the manner described in Example VI.

It will be appreciated that the process of the invention is applicable to leaching of other metals, including zinc, nickel, cobalt, uranium, vanadium, molybdenum, titanium, and chromium, as well as a wide variety of other metals, from their sulfide ores, as illustrated by the following examples.

EXAMPLE IX

A lixiviant is formulated having the following composition:

| | |
|---|---|
| NaCl | g .010 |
| $MgSO_4 \cdot 7H_2O$ | g 8.5 |
| $CaCl_2$ | g 0.05 |
| $Al_2(SO_4)_3 \cdot 18H_2O$ | g 130.0 |
| $FeSO_4 \cdot 7H_2O$ | g 30.0 |
| Carbamide phosphoric acid | g 2.5 |
| Water | ml 1000.0 |

The foregoing solution is inoculated with a culture of the bacteria used in Examples 2 to 5, and is then contracted with a low-grade zinc sulfide ore in an airlift percolator. After 100 hours of operation, the solution contains 1535 p.p.m. of zinc. This content is appreciably higher than the one obtained with a control test in which carbamide phosphoric acid was absent.

EXAMPLE X

A lixiviant solution is formulated as follows:

| | |
|---|---|
| NaCl | g 0.015 |
| $MgSO_4 \cdot 7H_2O$ | g 10.0 |
| $Al_2(SO_4)_3 \cdot 18H_2O$ | g 100.0 |
| $FeSO_4 \cdot 7H_2O$ | g 20.0 |
| Carbamide phosphoric acid | g 2.0 |
| $Na_6P_6O_8$ | g 1.0 |
| Water | ml 1000.0 |

The solution is inoculated with a mixture culture of *Thiobacillus ferrooxidans* and *Thiobacillus thiooxidans*, and contacted with a molybdenum sulfide ore. A higher yield of molybdenum is obtained after 100 hours of operation as compared to a control test without carbamide phosphoric acid and phosphate.

It will be apparent from the foregoing that we have provided a new and improved method and composition for use in the bacterial leaching of metals from ores, metallurgical waste and other metallurgical materials, even when present in low concentrations, wherein the lixiviant composition has increased activity to thereby increase the rate at which the metallic components are leached from the metallurgical materials. The process and composition of the present invention provide both a sample and economical method for increasing the amount of metallic constituents which can be extracted from low-grade ores or waste from which such metal components are otherwise impractical to recover.

It will be understood that various changes may be made in the details of formulation and operation without departing from the spirit of the invention as defined in the following claims.

We claim:

1. In a process for the extraction of metallic constituents from metallurgical materials wherein a ferrous sulfate lixiviant solution containing bacteria capable of oxidizing ferrous iron is brought into contact with said metallurgical material, the improvement wherein said lixiviant solution is formulated to contain carbamide phosphoric acid.

2. A process as defined in claim 1 wherein said carbamide phosphoric acid is present in an amount corresponding to 0.01 to 25.0 parts per thousand parts of lixiviant solution.

3. A process as defined in claim 1 wherein said lixiviant solution also contains a compound selected from the group consisting of water-soluble phosphatic compounds, thiourea and mixtures thereof.

4. A process as defined in claim 3 wherein said compound is present in an amount constituting 0.001 to 10.0 grams per liter.

5. A process as defined in claim 3 wherein said compound is a water-soluble phosphatic compound selected from a group consisting of hexametaphosphates and tripolyphosphates.

6. A process as defined in claim 1 wherein said metallic constituent extracted is a metal selected from a group consisting of copper, zinc, nickel, cobalt, uranium, vanadium, molybdenum, titanium and chromium.

7. A process as defined in claim 1 wherein said metallurgical material is a low-grade sulfide ore.

8. A process as defined in claim 1 wherein said lixiviant solution also contains a compound having a cation selected from a group consisting of alkali metal and alkaline earth metal, and an anion selected from the group consisting of halides and nitrates, and magnesium sulfate, aluminum sulfate, ammonium sulfate, sulfuric acid and mixtures thereof.

9. A process as defined in claim 8 wherein said compound is selected from the group consisting of alkali metal, alkaline earth metal, halide and nitrate, and is present in an amount constituting .001 to 10 grams per liter of lixiviant solution.

10. A process as defined in claim 8 wherein said compound is selected from a group consisting of magnesium sulfate, aluminum sulfate, ammonium sulfate, sulfuric acid and mixtures thereof, and is present in an amount constituting 1.0 to 500 grams per liter of lixiviant solution.

11. A process as defined in claim 1 wherein said bacteria comprises a mixed culture of bacteria capable of oxidizing ferrous iron and bacteria capable of oxidizing sulfur.

12. A process as defined in claim 1 wherein said bacteria is selected from a group consisting of *Thiobacillus ferrooxidans* and *Thiobacillus ferrooxidans* mixed with *Thiobacillus thiooxidans*.

References Cited
UNITED STATES PATENTS

| | | | |
|---|---|---|---|
| 2,829,964 | 4/1958 | Zimmerley et al. | 75—104 |
| 3,218,252 | 11/1965 | Glover et al. | 210—4 |
| 3,266,889 | 8/1966 | Duncan et al. | 75—101 |
| 3,305,353 | 2/1967 | Duncan et al. | 75—101 |
| 3,330,650 | 7/1967 | Zimmerley et al. | 75—104 |
| 3,347,661 | 10/1967 | Mayling | 75—104 |
| 3,433,629 | 3/1969 | Imai et al. | 75—101 |
| 3,455,679 | 7/1969 | Mayling | 75—101 |

L. DEWAYNE RUTLEDGE, Primary Examiner

G. T. OZAKI, Assistant Examiner

U.S. Cl. X.R.

75—104, 115, 117, 119, 120, 121; 195—2

UNITED STATES PATENT OFFICE

CERTIFICATE OF CORRECTION

Patent No. 3,679,397     Dated July 25, 1972

Lawrence T. O'Connor, James A. Brierley and Roshan B. Bhappu

It is certified that errors appear in the above identified patent and that said Letters Patent are hereby corrected as shown below:

Column 1, line 48, change "1952" to read -- 1954 --

Column 5, line 46, change "sample" to read -- simple --

Signed and sealed this 13th day of March 1973.

(SEAL)
Attest:

EDWARD M. FLETCHER, JR.
Attesting Officer

ROBERT GOTTSCHALK
Commissioner of Patents